(12) United States Patent
Yoo et al.

(10) Patent No.: US 12,404,611 B2
(45) Date of Patent: Sep. 2, 2025

(54) TIRE CORD

(71) Applicant: KOLON INDUSTRIES, INC., Seoul (KR)

(72) Inventors: Seung Min Yoo, Seoul (KR); Sung Ho Park, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 0 days.

(21) Appl. No.: 18/549,894

(22) PCT Filed: Jan. 24, 2022

(86) PCT No.: PCT/KR2022/001204
§ 371 (c)(1),
(2) Date: Sep. 8, 2023

(87) PCT Pub. No.: WO2022/203183
PCT Pub. Date: Sep. 29, 2022

(65) Prior Publication Data
US 2024/0157730 A1   May 16, 2024

(30) Foreign Application Priority Data
Mar. 24, 2021   (KR) .......................... 10-2021-003824

(51) Int. Cl.
*D02G 3/48*       (2006.01)
*B60C 9/00*       (2006.01)
*D01F 6/62*       (2006.01)

(52) U.S. Cl.
CPC ............ *D02G 3/48* (2013.01); *B60C 9/0042* (2013.01); *D01F 6/62* (2013.01); *D10B 2331/04* (2013.01); *D10B 2505/022* (2013.01)

(58) Field of Classification Search
CPC ............ D02G 3/48; B60C 9/0042; D01F 6/62
See application file for complete search history.

(56) References Cited

U.S. PATENT DOCUMENTS

| | | | |
|---|---|---|---|
| 5,643,515 A  * | 7/1997 | Davies | ..................... D01D 5/16 |
| | | | 425/464 |
| 2015/0174961 A1* | 6/2015 | Kramer | .................. D02G 3/045 |
| | | | 525/425 |
| 2015/0211150 A1 | 7/2015 | Park | |
| 2024/0001714 A1 | 1/2024 | Kramer | |

FOREIGN PATENT DOCUMENTS

| | | | | |
|---|---|---|---|---|
| CN | 103827368 A | | 5/2014 | |
| CN | 108084424 A  * | | 5/2018 | .......... C08G 63/916 |
| DE | 102010017107 A1 * | | 12/2011 | .......... B60C 9/0042 |
| DE | 102019208988 A1 | | 12/2020 | |

(Continued)

OTHER PUBLICATIONS

International Search Report dated May 9, 2022.
The Office Action dated Jul. 16, 2025, of the corresponding Chinese Patent Application.

*Primary Examiner* — Shaun R Hurley
(74) *Attorney, Agent, or Firm* — Harvest IP Law, LLP

(57) ABSTRACT

The present disclosure relates to a tire cord. The tire cord includes a polyester drawn yarn containing recycled polyethylene terephthalate. The tire cord may exhibit excellent physical properties industrially required while including eco-friendly materials.

12 Claims, 1 Drawing Sheet

(56) References Cited

FOREIGN PATENT DOCUMENTS

| | | | |
|---|---|---|---|
| DE | 102019212162 A1 * | 2/2021 | |
| EP | 3753965 A1 | 12/2020 | |
| EP | 4006217 A1 | 6/2022 | |
| JP | 2002-235243 A | 8/2002 | |
| JP | 2002-235243 A1 | 8/2002 | |
| JP | 2004-091934 A | 3/2004 | |
| JP | 2004-091934 A1 | 3/2004 | |
| JP | 2004100087 A | 4/2004 | |
| JP | 2004-218128 A | 8/2004 | |
| JP | 2004-218128 A1 | 8/2004 | |
| JP | 2006118062 A | 5/2006 | |
| JP | 2012126763 A | 7/2012 | |
| JP | 2014-504338 A | 2/2014 | |
| JP | 2018130974 A | 8/2018 | |
| JP | 2022-533443 A | 7/2022 | |
| KR | 1993-0010798 B1 | 11/1993 | |
| KR | 20100128368 A | 12/2010 | |
| KR | 2012-0001939 A1 | 1/2012 | |
| KR | 20120001939 A | 1/2012 | |
| KR | 101205942 B1 | 11/2012 | |
| KR | 101968993 B1 | 4/2019 | |
| KR | 20210004876 A | 1/2021 | |
| WO | WO-2011147635 A1 * | 12/2011 | ........... B60C 9/0042 |
| WO | WO-2020254215 A1 * | 12/2020 | ........... B60C 9/0042 |
| WO | 2022-111927 A1 | 6/2022 | |

* cited by examiner

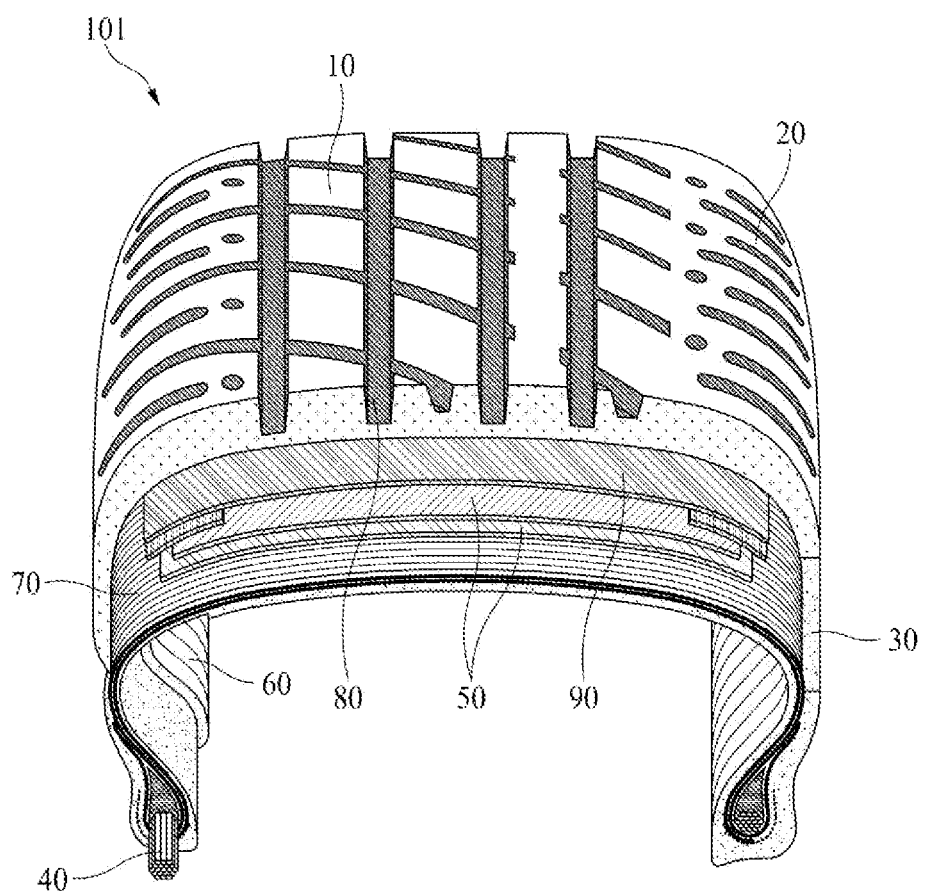

TIRE CORD

CROSS-REFERENCE TO RELATED APPLICATION(S)

This application is a National Stage of International Application No. PCT/KR2022/001204 filed Jan. 24, 2022, claiming priority based on Korean Patent Application No. 10-2021-filed Mar. 24, 2021, the disclosure of which is incorporated herein by reference in their entirety.

TECHNICAL FIELD

The present disclosure relates to a tire cord including a polyester drawn yarn containing recycled polyethylene terephthalate.

BACKGROUND OF ART

As the vehicle performance and road conditions gradually improve, it is required to maintain stability and durability of tires during high-speed driving. In addition, considering environmental issues, energy issues, fuel efficiency, and the like, lightweight tires with excellent durability are required. As one way to meet these demands, research on tire cords used as a rubber reinforcing material for tires is being actively conducted.

The tire cords may be classified according to the part and role where tire cord is used. For example, they may be divided into a carcass for entirely supporting the tire, a belt for supporting load and preventing deformation upon high-speed driving and a cap ply for preventing deformation of the belt (see FIG. 1).

Meanwhile, many countries including the European Union are mandating the use of recycled materials in vehicle products while strengthening environmental regulations. Accordingly, a method of applying recycled plastics (for example, polyethylene terephthalate) discarded after being used as a plastic container or fiber to the manufacture of vehicle products has been attempted.

However, the recycled plastics have poor physical properties compared to original plastic materials, and deterioration of physical properties due to thermal decomposition in the processing is inevitable.

Therefore, there is a demand for a method capable of overcoming the limitations of physical properties of the recycled plastics while being eco-friendly by using recycled plastics.

DETAILED DESCRIPTION OF THE INVENTION

Technical Problem

In the present disclosure, there is provided a tire cord including a polyester drawn yarn containing recycled polyethylene terephthalate.

In addition, there is provided a tire including the above-described tire cord.

Technical Solution

According to an embodiment of the present disclosure, there is provided a tire cord including a polyester drawn yarn containing 25 wt % or more of recycled polyethylene terephthalate having an intrinsic viscosity of 1.5 dl/g or less and an isophthalic acid content of less than 1.0 mol % based on the total carboxylic acid component, wherein a tensile strength is 7.0 g/d to 8.0 g/d and an elongation at break is 15.0% to 17.5% when measured according to the standard test method of ASTM D 885.

According to another embodiment of the present disclosure, there is provided a tire including the above-described tire cord.

Hereinafter, the tire cord and the tire including the same according to embodiments of the present disclosure will be described in more detail.

Unless defined otherwise herein, all technical and scientific terms have the same meaning as commonly understood by a person skilled in the art to which the invention pertains. The terms used in this disclosure are merely to effectively describe specific embodiments and are not intended to limit the present invention.

Singular expressions of the present disclosure may include plural expressions unless they are differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, components and/or groups.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

In this disclosure, when the position relation between two parts is described using the terms such as "on", "above", "below", and "next", one or more parts may be positioned between the two parts unless the terms are used with the term "immediately" or "directly".

In this disclosure, when the relation of a time sequential order is described using the terms such as "after", "continuously to", "next to", and "before", a case which is not continuous may be included unless the terms are used with the term "immediately" or "directly".

In this disclosure, the term "at least one" should be understood to include all combinations which can be presented from one or more related items.

In this disclosure, the term 'recycled polyethylene terephthalate', 'recycled PET', or 'r-PET' refers to PET resin recycled for the purpose of reusing discarded polyethylene terephthalate (PET) after being used for its original purpose such as various containers, films, sheets, fibers, and the like.

In this disclosure, the term 'virgin polyethylene terephthalate', 'virgin PET' or 'v-PET' is a term for distinguishing from the recycled polyethylene terephthalate, recycled PET or r-PET, and refers to original PET resin that has not been recycled for manufacturing various containers, films, sheets, fibers, etc.

In this disclosure, the term 'primarily twisted yarn' refers to a single yarn made by twisting one filament in either direction.

In this disclosure, the term 'plied yarn' refers to a yarn made by twisting two or more primarily twisted yarns together in either direction, and is also referred to as 'raw-cord'.

In this disclosure, the term 'tire cord' refers to a plied yarn containing an adhesive so that it can be directly applied to a rubber product for a tire, and is also referred to as a 'dip-cord'.

Yarns for tire cords manufactured by applying recycled PET are generally difficult to have high strength. One of the reasons may be the low intrinsic viscosity of recycled PET. If the intrinsic viscosity of the material is low, it is difficult to orient the polymer during the manufacture of yarn. As a result, it is difficult to sufficiently apply the required spinning tension to the yarn, and there is a limit in the strength that can be developed.

Recycled PET is mostly obtained from waste bottles made of PET for reasons of supply and cost. However, the PET bottles contain isophthalic acid for imparting high flexibility and a large amount of catalysts for improving reactivity. Additives such as isophthalic acid and catalysts contained in recycled PET may act as defects in the manufacture of yarns for tire cords. This is because the additives may interfere with the axial orientation of the yarn in the manufacture of yarns for tire cords requiring a high-speed spinning method for high tensile strength.

However, as a result of continuous research by the present inventors, it has been found that an eco-friendly tire cord having excellent physical properties can be provided by using a polyester drawn yarn obtained by controlling the intrinsic viscosity and the isophthalic acid content of recycled PET.

According to an embodiment of the present disclosure, there is provided a tire cord including a polyester drawn yarn containing 25 wt % or more of recycled PET having an intrinsic viscosity of 0.9 dl/g to 1.5 dl/g and an isophthalic acid content of less than 1.0 mol % based on the total carboxylic acid component, wherein a tensile strength is 7.0 g/d to 8.0 g/d and an elongation at break is 15.0% to 17.5% when measured according to the standard test method of ASTM D 885.

In the case of melt spinning for producing a yarn, a process of melting the raw material at a temperature equal to or higher than the melting point is preceded. However, a raw material having a high crystallinity has a high melting point, and accordingly, the process temperature of melt spinning must be increased. This increase in the process temperature causes a problem of thermal decomposition of the raw material and the resulting deterioration in physical properties of the yarn, as well as an increase in costs such as an increase in energy consumption or equipment improvement. In particular, the recycled PET generally undergoes a process of melting waste PET during its recovery process, and thus the above-described problems may be aggravated in the case of melt spinning using recycled PET.

However, when applying recycled PET having an intrinsic viscosity of 0.9 dl/g to 1.5 dl/g and an isophthalic acid content of less than 1.0 mol % based on the total carboxylic acid component, the crystallinity of the recycled PET can be controlled below an appropriate level, and as a result, the above-described problems can be avoided. That is, when recycled PET whose intrinsic viscosity and isophthalic acid content are controlled within the above range is applied, an eco-friendly tire cord having excellent physical properties can be provided.

In one example, the recycled PET may have an isophthalic acid content of less than 1.0 mol %, 0.95 mol % or less, 0.9 mol % or less, 0.85 mol % or less, or 0.8 mol % or less based on the total dicarboxylic acid component included in the recycled PET.

Preferably, the recycled PET may have an isophthalic acid content of 0 mol % or more and less than 1.0 mol %, 0 mol % to 0.95 mol %, 0 mol % to 0.9 mol %, 0 mol % to 0.85 mol %, 0 mol % to 0.8 mol %, 0.1 mol % or more and less than 1.0 mol %, 0.1 mol % to 0.95 mol %, 0.1 mol % to 0.9 mol %, 0.1 mol % to 0.85 mol %, 0.1 mol % to 0.8 mol %, 0.25 mol % or more and less than 1.0 mol %, 0.25 mol % to 0.95 mol %, 0.25 mol % to 0.9 mol %, 0.25 mol % to 0.85 mol %, 0.25 mol % to 0.8 mol %, 0.5 mol % or more and less than 1.0 mol %, 0.5 mol % to 0.95 mol %, 0.5 mol % to 0.9 mol %, 0.5 mol % to 0.85 mol %, or 0.5 mol % to 0.8 mol % based on the total dicarboxylic acid component included in the recycled PET.

In addition, the recycled PET may have a terephthalic acid content of more than 99.0 mol % and 100.0 mol % or less, 99.05 mol % to 100.0 mol %, 99.10 mol % to 100.0 mol %, 99.15 mol % to 100.0 mol %, 99.20 mol % to 100.0 mol %, more than 99.0 mol % and 99.9 mol % or less, 99.05 mol % to 99.9 mol %, 99.10 mol % to 99.9 mol %, 99.15 mol % to 99.9 mol %, 99.20 mol % to 99.9 mol %, more than 99.0 mol % and 99.75 mol % or less, 99.05 mol % to 99.75 mol %, 99.10 mol % to 99.75 mol %, 99.15 mol % to 99.75 mol %, 99.20 mol % to 99.75 mol %, more than 99.0 mol % and 99.50 mol % or less, 99.05 mol % to 99.50 mol %, 99.10 mol % to 99.50 mol %, 99.15 mol % to 99.50 mol %, or 99.20 mol % to 99.50 mol %, based on the total dicarboxylic acid component included in the recycled PET.

Herein, the isophthalic acid content and the terephthalic acid content refer to the content of isophthalic acid, terephthalic acid or units derived therefrom based on the total dicarboxylic acid or units derived therefrom included in the recycled PET. The isophthalic acid content and the terephthalic acid content can be determined by calculating the peak intensity of a predetermined proton through NMR measurement of the recycled PET, and then calculating the content (mol %) of the isophthalic acid component and the content (mol %) of the terephthalic acid component in 100 mol % of the dicarboxylic acid component.

In another example, the recycled PET may have an intrinsic viscosity of 0.9 dl/g to 1.5 dl/g. As confirmed through the examples below, when the intrinsic viscosity of the recycled PET is less than 0.9 dl/g, the tensile strength and elongation at break may not be sufficiently secured in the polyester drawn yarn and tire cord including the recycled PET. However, when the intrinsic viscosity of the recycled PET exceeds 1.5 dl/g, the pack pressure increases due to the deterioration in flowability of the polymer by the high viscosity during the manufacture of a polyester drawn yarn and a tire cord, and a pack leak phenomenon may occur, resulting in a large amount of fluff and frequent breakage.

Specifically, the recycled PET may have an intrinsic viscosity of 0.9 dl/g or more, 0.95 dl/g or more, or 1.0 dl/g or more. Further, the recycled PET may have an intrinsic viscosity of 1.5 dl/g or less, 1.45 dl/g or less, 1.4 dl/g or less, 1.35 dl/g or less, 1.3 dl/g or less, 1.25 dl/g or less, or 1.2 dl/g or less.

Preferably, the recycled PET may have an intrinsic viscosity of 0.90 dl/g to 1.45 dl/g, 0.90 dl/g to 1.40 dl/g, 0.90 dl/g to 1.35 dl/g, 0.90 dl/g to 1.30 dl/g, 0.90 dl/g to 1.25 dl/g, 0.90 dl/g to 1.20 dl/g, 0.95 dl/g to 1.50 dl/g, 0.95 dl/g to 1.45 dl/g, 0.95 dl/g to 1.40 dl/g, 0.95 dl/g to 1.35 dl/g, 0.95 dl/g to 1.30 dl/g, 0.95 dl/g to 1.25 dl/g, 0.95 dl/g to 1.20 dl/g, 1.00 dl/g to 1.50 dl/g, 1.00 dl/g to 1.45 dl/g, 1.00 dl/g to 1.40 dl/g, 1.00 dl/g to 1.35 dl/g, 1.00 dl/g to 1.30 dl/g, 1.00 dl/g to 1.25 dl/g, or 1.00 dl/g to 1.20 dl/g.

The intrinsic viscosity may be measured using an Ubbelohde viscometer and an aspirator, or an automatic viscometer after preparing a sample solution by dissolving the resin to be measured in an organic solvent.

The content of the recycled PET included in the polyester drawn yarn is preferably 25 wt % or more, 25 wt % to 100 wt %, or 30 wt % to 100 wt %. That is, from the aspect of environmental protection and resource recycling, the recycled PET is preferably included in an amount of 25 wt % or more, or 30 wt % or more in the polyester drawn yarn.

Optionally, the content of the recycled PET can be adjusted according to the recycling method from which the recycled PET is derived.

For example, when the recycled PET is derived from a chemical recycling method, the content of the recycled PET included in the polyester drawn yarn may be 25 wt % to 100 wt %, or 30 wt % to 100 wt %. The chemically recycled PET, which is obtained by changing the chemical structure of waste PET through depolymerization, hydrolysis, repolymerization, and the like, enables the expression of relatively excellent and stable physical properties. Accordingly, the chemically recycled PET may be included in the polyester drawn yarn in an amount of up to 100 wt %.

As another example, when the recycled PET is derived from a physical recycling method, the content of the recycled PET included in the polyester drawn yarn may be 25 wt % to 95 wt %, or 30 wt % to 90 wt %. The physically recycled PET, which is obtained as flakes through recovery of waste PET, color sorting, crushing, washing, drying, and the like, has a relatively large variation in physical properties, and deterioration in physical properties due to thermal decomposition needs to be considered in the processing using the physically recycled PET as a raw material. Accordingly, the physically recycled PET may be included in the polyester drawn yarn in an amount of 95 wt % or less, or 90 wt % or less.

In one example, the polyester drawn yarn may include virgin PET together with the recycled PET. Preferably, the polyester drawn yarn may include the recycled PET within the above-described content range and a residual amount of the virgin PET. The virgin PET may not contain isophthalic acid or a unit derived therefrom.

Preferably, the virgin PET may have an intrinsic viscosity of 0.8 dl/g to 1.4 dl/g in order to prevent the occurrence of a large amount of fluff and breakage while ensuring sufficient tensile strength and elongation at break in the polyester drawn yarn and tire cord.

Specifically, the virgin PET may have an intrinsic viscosity of 0.8 dl/g or more, 0.85 dl/g or more, 0.9 dl/g or more, 0.95 dl/g or more, or 1.0 dl/g or more. In addition, the virgin PET may have an intrinsic viscosity of 1.4 dl/g or less, 1.35 dl/g or less, 1.3 dl/g or less, or 1.25 dl/g or less.

More preferably, the virgin PET may have an intrinsic viscosity of 0.8 dl/g to 1.4 dl/g, 0.85 dl/g to 1.4 dl/g, 0.85 dl/g to 1.35 dl/g, 0.9 dl/g to 1.35 dl/g, 0.9 dl/g to 1.3 dl/g, 0.95 dl/g to 1.3 dl/g, 0.95 dl/g to 1.25 dl/g, or 1.0 dl/g to 1.25 dl/g.

Meanwhile, the polyester drawn yarn included in the tire cord may have an appropriate fineness within the range capable of satisfying the physical properties according to the present disclosure. For example, the polyester drawn yarn may have a single yarn fineness of 2 denier to 15 denier and a total fineness of 500 denier to 3000 denier.

The tire cord includes a raw-cord made by twisting two or more strands of the polyester drawn yarn together in either direction, and an adhesive attached to the raw-cord.

Preferably, the tire cord may include the raw-cord having a total fineness of denier to 9000 denier, 1000 denier to 8000 denier, 1000 denier to 7000 denier, or 1000 denier to 6000 denier.

Preferably, the tire cord may be a 2-ply yarn including the polyester drawn yarn. As a non-limiting example, the raw-cord may have a total fineness of 1000 denier to 6000 denier by 2-ply-twisting the polyester drawn yarn having a fineness of denier to 3000 denier.

The tire cord can exhibit excellent properties in terms of contribution to environmental protection by containing the recycled PET. Furthermore, the tire cord includes a polyester drawn yarn containing recycled PET that meets the intrinsic viscosity and the isophthalic acid content within the above-described range, thereby exhibiting the same level of mechanical properties and dimensional stability as those of a tire cord obtained using only virgin PET.

In one example, the tire cord may exhibit a tensile strength of 7.0 g/d to 8.0 g/d and an elongation at break of 15.0% to 17.5%, when measured according to the standard test method of ASTM D 885.

Specifically, the tire cord may have a tensile strength of 7.0 g/d or more, 7.1 g/d or more, or 7.2 g/d or more; and 8.0 g/d or less, 7.95 g/d or less, or 7.9 g/d or less.

In addition, the tire cord may have an elongation at break of 15.0% or more, 15.1% or more, 15.2% or more, 15.3% or more, 15.4% or more, or 15.5% or more; and 17.5% or less, 17.2% or less, 17.0% or less, 16.9% or less, 16.8% or less, 16.7% or less, or 16.6% or less.

Preferably, the tire cord may have a tensile strength of 7.1 g/d to 8.0 g/d, 7.1 g/d to 7.95 g/d, 7.2 g/d to 7.95 g/d, or 7.2 g/d to 7.9 g/d; and an elongation at break of 15.1% to 17.5%, 15.1% to 17.2%, 15.2% to 17.2%, 15.2% to 17.0%, 15.3% to 17.0%, 15.3% to 16.9%, 15.4% to 16.9%, 15.4% to 16.8%, 15.5% to 16.8%, 15.5% to 16.7%, or 15.5% to 16.6%.

The tensile strength and elongation at break may be measured according to the standard test method of ASTM D 885 using a general-purpose tester.

In one example, the tire cord may have an elongation at specific load of 3.5% to 5.0% when measured under a load of 4.5 g/d according to the standard test method of ASTM D 885. The elongation at specific load refers to the elongation at a load of 4.5 g/d in the Stress-Strain curve obtained when measuring the tensile strength and elongation at break.

Specifically, the tire cord may have an elongation at specific load of 3.5% or more, or 4.0% or more; and 5.0% or less, or 4.5% or less. Preferably, the tire cord may have an elongation at specific load of 4.0% to 5.0%, or 4.0% to 4.5%.

In one example, the tire cord may exhibit a thermal shrinkage of 3.0% to 6.0% when measured according to the standard test method of ASTM D 885 (specimen length 250 mm, 177° C., 2 minutes, load of 0.01 g/d). Herein, (+) thermal shrinkage value means shrinkage behavior, and (−) shrinkage value means relaxation behavior.

Specifically, the tire cord may have a thermal shrinkage of 6.0% or less, 5.9% or less, 5.8% or less, 5.7% or less, 5.6% or less, 5.5% or less, 5.4% or less, 5.3% or less, or 5.2% or less; and 3.0% or more, 3.1% or more, or 3.2% or more.

Preferably, the tire cord may have a thermal shrinkage of 3.0% to 5.9%, 3.0% to 5.8%, 3.0% to 5.7%, 3.0% to 5.6%, 3.0% to 5.5%, 3.0% to 5.4%, 3.0% to 5.3%, 3.0% to 5.2%, 3.1% to 5.9%, 3.1% to 5.8%, 3.1% to 5.7%, 3.1% to 5.6%, 3.1% to 5.5%, 3.1% to 5.4%, 3.1% to 5.3%, 3.1% to 5.2%, 3.2% to 5.9%, 3.2% to 5.8%, 3.2% to 5.7%, 3.2% to 5.6%, 3.2% to 5.5%, 3.2% to 5.4%, 3.2% to 5.3%, or 3.2% to 5.2%.

In one example, the tire cord may exhibit a strength ratio of 88.5% or more. Herein, the strength ratio is a value calculated by the equation of {[(tensile strength of tire cord)/(tensile strength of polyester drawn yarn)]×100}.

Specifically, the tire cord may have a strength ratio of 88.5% or more, 88.6% or more, 88.7% or more, 88.8% or more, or 88.9% or more; and 91.0% or less, 90.8% or less, or 0.6% or less, or 90.4% or less.

Preferably, the tire cord may have a strength ratio of 88.5% to 91.0%, 88.5% to 90.8%, 88.6% to 90.8%, 88.6% to 90.6%, 88.7% to 90.6%, 88.7% to 90.4%, 88.8% to 90.4%, or 88.9% to 90.4%.

Meanwhile, the polyester drawn yarn included in the tire cord may be a drawn yarn made of PET material obtained by using the recycled PET and the virgin PET.

In order for the tire cord to have the above-described physical properties, the polyester drawn yarn included in the tire cord may have a tensile strength of 8.0 g/d to 9.0 g/d and an elongation at break of 14.0% to 17.0%.

Specifically, the polyester drawn yarn may have a tensile strength of 8.0 g/d or more, or 8.1 g/d or more; and 9.0 g/d or less, 8.9 g/d or less, or 8.8 g/d or less.

Further, the polyester drawn yarn may have an elongation at break of 14.0% or more, 14.5% or more, or 15.0% or more; and 17.0% or less, 16.5% or less, 16.0% or less, or 15.6% or less.

Preferably, the polyester drawn yarn may have a tensile strength of 8.1 g/d to 9.0 g/d, 8.1 g/d to 8.9 g/d, or 8.1 g/d to 8.8 g/d; and an elongation at break of 14.5% to 17.0%, 14.5% to 16.5%, 14.5% to 16.0%, 14.5% to 15.6%, or 15.0% to 15.6%.

The polyester drawn yarn may have a total draw ratio of 1.0 times to 3.0 times, 1.5 times to 3.0 times, or 1.5 times to 2.5 times. In order to increase the degree of orientation through drawing and exhibit appropriate strength, the total draw ratio of the polyester drawn yarn is preferably 1.0 times or more. However, in order to prevent a breakage due to excessive drawing, the total draw ratio of the polyester drawn yarn is preferably 3.0 times or less.

The polyester drawn yarn may exhibit a thermal shrinkage of 9.5% to 15.0% when measured according to the standard test method of ASTM D 885 (specimen length 250 mm, 177° C., 2 minutes, load of 0.01 g/d).

Specifically, the polyester drawn yarn may exhibit a thermal shrinkage of 15.0% or less, 14.5% or less, 14.0% or less, or 13.7% or less; and 9.5% or more, 9.6% or more, 9.7% or more, or 9.8% or more.

Preferably, the polyester drawn yarn may exhibit a thermal shrinkage of 9.6% to 15.0%, 9.6% to 14.5%, 9.7% to 14.5%, 9.7% to 14.0%, or 9.8% to 13.7%.

Meanwhile, the polyester drawn yarn may be obtained by a method of melt-spinning and drawing a material containing 25 wt % to 95 wt % of recycled PET having an intrinsic viscosity of 0.9 dl/g to 1.5 dl/g and an isophthalic acid content of less than 1.0 mol % based on the total carboxylic acid component.

In order to sufficiently melt the material while preventing excessive thermal decomposition and ensuring excellent spinnability, the melting of the material may be performed at a temperature of 250° C. to 320° C., 260° C. to 310° C., or 270° C. to 300° C.

The spinning speed of the melt spinning is preferably adjusted to 2000 m/min or more and less than 4000 m/min, 2000 m/min to 3500 m/min, or 2000 m/min to 3000 m/min. The spinning speed may be adjusted in consideration of physical properties of the material. However, when the spinning speed is too high, a breakage may occur, making it difficult to manufacture a yarn.

The undrawn yarn obtained through the melt spinning may be cooled at a temperature of 15° C. to 60° C.

In addition, the undrawn yarn may be drawn within the above range using a drawing machine having a plurality of rollers.

After the drawing process, heat setting, relaxation, and winding processes may be additionally performed. In one example, the relaxation process may be performed at a relaxation rate of 1% to 3%. In order to prevent a breakage due to excessively high tension, the relaxation rate is preferably 1% or more. However, since airtightness or durability may deteriorate due to excessive relaxation, the relaxation rate is preferably 3% or less.

Meanwhile, the tire cord may be manufactured by a conventional method using the polyester drawn yarn.

In one example, a raw-cord may be manufactured by putting the polyester drawn yarn into a cable cord twisting machine and performing Z-twisting and S-twisting with a twist number of 200 TPM to 500 TPM. A tire cord (dip-cord) may be manufactured by immersing the raw-cord in an adhesive coating liquid, followed by drying and heat treatment.

According to another embodiment of the present disclosure, there is provided a tire including the tire cord described above.

FIG. 1 is a partially cutaway view of a tire 101 according to an embodiment of the present invention.

The tire cord may be applied to at least one of a cap ply 90, a belt 50, and a cacass 70 of the tire 101.

Referring to FIG. 1, the tire 101 includes a tread 10, a shoulder 20, a side wall 30, a bead 40, a belt 50, an inner liner 60, a carcass 70, and a cap ply 90. The tread 10 is a part which directly contacts the road surface. The tread 10 is a strong rubber layer attached to the outside of the cap ply 90, and is made of a rubber having excellent abrasion resistance. The tread 10 plays a direct role in transmitting the driving force and braking force of the vehicle to the ground. Grooves 80 are formed in the region of the tread 10.

The shoulder 20 is a corner portion of the tread 10 and is a portion connected to the side wall 30. The shoulder 20 is one of the weakest parts of the tire along with the sidewall (30).

The side wall 30 is a side portion of the tire 101 connecting a tread 10 and a bead 40, protects a carcass 70, and provides lateral stability to the tire.

The bead 40 is a region that contains an iron wire winding the end of the carcass 70, and has a structure in which the iron wire is covered with a rubber film to wrap the cord. The bead 40 serves to mount and secure the tire 101 to a wheel rim.

The belt 50 is a coat layer located between the tread 10 and the carcass 70. The belt 50 serves to prevent damage to internal components such as the carcass 70 due to external shocks or external conditions, and allows the shape of the tread 10 to keep flat so that the contact between the tire 101 and the road surface is maintained in an optimum state. The belt 50 may include the tire cord according to an embodiment of the present invention.

The inner liner 60 is used in place of tubes in tubeless tires and is made of special rubber that has little or no air permeability. The inner liner 60 prevents the air filled in the tire 101 from leaking.

The carcass 70 is made by overlapping multiple sheets of cord papers made of strong synthetic fibers, and is an important part that forms the skeleton of the tire 101. The carcass 70 serves to withstand the load or impact received by the tire 101 and to maintain the air pressure. The carcass 70 may include the tire cord according to an embodiment of the present invention.

The groove 80 refers to a thick void in the tread area. The groove 80 functions to increase drainage and grip of the tire when driving on a wet road.

The cap ply 90 is a protective layer under the tread 10 and protects other components therein. The cap ply 90 is essentially applied to a vehicle traveling at high speed. In particular, as the traveling speed of the vehicle increases, problems such as deterioration of ride comfort due to deformation of the belt portion of the tire occur. Thus, the importance of the cap ply 90 to prevent deformation of the belt portion is increasing. The cap ply 90 may include the tire cord according to an embodiment of the present invention.

Advantageous Effects

The tire cord according to the present disclosure may exhibit excellent physical properties industrially required while including eco-friendly materials.

BRIEF DESCRIPTION OF THE DRAWINGS

FIG. 1 is a partially cutaway view of a tire according to an embodiment of the present disclosure.

DESCRIPTION OF SYMBOLS

10: Tread
20: Shoulder
30: Side wall
40: Bead
50: Belt
60: Inner liner
70: Carcass
80: Groove
90: Cap ply
101: Tire

DETAILED DESCRIPTION OF THE EMBODIMENTS

Hereinafter, preferred examples are presented to aid understanding of the invention. However, the following examples are provided to exemplify embodiments of the present invention, and the content of the present invention is not limited by the following examples.

Reference Example

A virgin PET chip made of terephthalic acid and ethylene glycol and having an intrinsic viscosity of 1.2 dl/g was prepared. The virgin PET chip was put into a single screw extruder and melted to prepare a melt for spinning.

The melt for spinning was extruded through a spinneret to obtain a polyester drawn yarn having a total fineness of 1000 denier (single yarn fineness of about 4 denier). The process of obtaining the polyester drawn yarn was performed under a spinning temperature of 290° C., a spinning speed of 3000 m/min, a total draw ratio of 1.5 times, and a relaxation rate of 1.5% (heat treatment at 180° C. after drawing).

The polyester drawn yarn was put into a cable cord twisting machine, and 430 TPM Z-twisting and 430 TPM S-twisting were simultaneously performed, respectively, to prepare a 2-plied yarn, raw-cord. After immersing the raw-cord in an adhesive coating solution containing resorcinol-formaldehyde-latex (RFL), drying was performed at 150° C. for 100 seconds, followed by heat treatment at 240° C. for 100 seconds to prepare a tire cord (dip-cord). The tension applied to the raw-cord in the immersion, drying and heat treatment processes was 0.5 kg/cord.

Example 1

A chemically recycled PET chip (A) having an isophthalic acid content of 0.8 mol % (terephthalic acid content is 99.2 mol %) and an intrinsic viscosity of 1.2 dl/g based on the total dicarboxylic acid component was prepared.

A virgin PET chip made of terephthalic acid and ethylene glycol and having an intrinsic viscosity of 1.2 dl/g was prepared.

A mixture containing 30 wt % of the recycled PET chip (A) and 70 wt % of the virgin PET chip was put into a single screw extruder and melted to prepare a melt for spinning.

The melt for spinning was extruded through a spinneret to obtain a polyester drawn yarn having a total fineness of 1000 denier (single yarn fineness of about 4 denier). The process of obtaining the polyester drawn yarn was performed under a spinning temperature of 290° C., a spinning speed of 2000 m/min, a total draw ratio of 2.5 times, and a relaxation rate of 1.5% (heat treatment at 180° C. after drawing).

A tire cord was manufactured in the same manner as in Reference Example, except that the polyester drawn yarn was used.

Example 2

A tire cord was manufactured in the same manner as in Example 1, except that a spinning speed of 3000 m/min and a total draw ratio of 1.5 times were applied in the process of obtaining the polyester drawn yarn.

Example 3

A tire cord was manufactured in the same manner as in Example 2, except for using a chemically recycled PET chip (B) having an isophthalic acid content of 0.8 mol % (terephthalic acid content is 99.2 mol %) based on the total dicarboxylic acid component and an intrinsic viscosity of 1.0 dl/g instead of the chemically recycled PET chip (A).

Comparative Example 1

A tire cord was manufactured in the same manner as in Example 1, except for using a chemically recycled PET chip (C) having an isophthalic acid content of 0.8 mol % (terephthalic acid content is 99.2 mol %) based on the total dicarboxylic acid component and an intrinsic viscosity of 0.8 dl/g instead of the chemically recycled PET chip (A).

Comparative Example 2

A tire cord was manufactured in the same manner as in Example 2, except for using a chemically recycled PET chip (C) having an isophthalic acid content of 0.8 mol % (terephthalic acid content is 99.2 mol %) based on the total dicarboxylic acid component and an intrinsic viscosity of 0.8 dl/g instead of the chemically recycled PET chip (A).

Comparative Example 3

A tire cord was manufactured in the same manner as in Example 2, except for using a chemically recycled PET chip (D) having an isophthalic acid content of 1.0 mol % (terephthalic acid content is 99.0 mol %) based on the total dicarboxylic acid component and an intrinsic viscosity of 1.2 dl/g instead of the chemically recycled PET chip (A).

Example 4

A tire cord was manufactured in the same manner as in Example 1, except that 50 wt % of the recycled PET chip (A) and 50 wt % of the virgin PET chip were used in the preparation of the melt for spinning.

Example 5

A tire cord was manufactured in the same manner as in Example 1, except that 70 wt % of the recycled PET chip (A) and 30 wt % of the virgin PET chip were used in the preparation of the melt for spinning.

Example 6

A tire cord was manufactured in the same manner as in Example 1, except that the virgin PET chip was not used and 100 wt % of the recycled PET chip (A) was used in the preparation of the melt for spinning.

Example 7

A tire cord was manufactured in the same manner as in Example 1, except for using a chemically recycled PET chip (E) having an isophthalic acid content of 0 mol % (terephthalic acid content is 100.0 mol %) based on the total dicarboxylic acid component and an intrinsic viscosity of 1.2 dl/g instead of the chemically recycled PET chip (A).

Comparative Example 4

A raw-cord and dip-cord were manufactured in the same manner as in
Example 1, except for using a chemically recycled PET chip (F) having an isophthalic acid content of 0.8 mol % (terephthalic acid content is 99.2 mol %) based on the total dicarboxylic acid component and an intrinsic viscosity of 1.6 dl/g instead of the chemically recycled PET chip (A).

Test Examples (1) Isophthalic Acid Content in PET Chip

Specimens were prepared by dissolving the PET chip in trifluoroacetic acid D (system peak: 11.50) at a concentration of 2% to 3%. The specimen was subjected to 64 MHz H-NMR using an NMR device (AS400; manufactured by Oxford Instruments) to measure the isophthalic acid (IPA) content in the specimen.
  IPA Peak: (a) 8.7~8.8 ppm, (b) 8.2~8.3 ppm, (c) 7.5~7.6 ppm
  IPA content (mol %)={[(a)area+(b)area+(c)area]×100}/(total area)

(2) Intrinsic Viscosity of Resin

The emulsion was extracted from the PET chip using carbon tetrachloride, and the PET chip was melted in o-chlorophenol (OCP) at 160±2° C. to prepare a sample. A viscosity of the sample in a viscometer was measured using an automatic viscometer (Skyvis-4000; SKC Limited, Korea) at 25° C., and then intrinsic viscosity (I.V.) was measured using the following equation.

Intrinsic viscosity (I.V.)={(0.0242×Rel)+0.2634}×F

Rel=[(time of flow of sample)×(specific gravity of sample)×(viscosity coefficient)]/(viscosity of OCP)

F=(I.V. of standard chip)/(average value of three I.V. measured with standard chip in standard operation)

(3) Tensile Strength, Elongation at Break and Elongation at Specific Load

According to the standard test method of ASTM D 885, tensile strength (g/d) and elongation at break (%) of the polyester drawn yarn and the tire cord were measured using an Instron universal testing machine. The specimen length was 250 mm, the tensile speed was 300 mm/min, and the initial load was set to 0.05 g/d.

The elongation at a load of 4.5 g/d in the Stress-Strain curve obtained by the above test was expressed as 'elongation at specific load'.

(4) Thermal Shrinkage

According to the standard test method of ASTM D 885, a specimen having a length of 250 mm was left at 25° C. and 65% RH for 24 hours, and then the length ($L_0$) was measured under a load of 0.01 g/d. After applying a load of 0.05 g/d to the specimen and applying heat at 177° C. for 2 minutes, the length ($L_1$) of the specimen was measured. The $L_0$ and $L_1$ were measured 5 times, and a change in length $\{=[(L_0-L_1)/L_0]\times 100\}$ of the specimen was expressed as the shrinkage. Herein, (+) thermal shrinkage value means shrinkage behavior, and (−) shrinkage value means relaxation behavior.

TABLE 1

| Polyester drawn yarn | Tensile strength (g/d) | Elongation at break (%) | Thermal shrinkage (%) | Yarn quality |
|---|---|---|---|---|
| Ref. Example | 8.6 | 16.1 | +10.2 | ◎ |
| Example 1 | 8.6 | 15.4 | +13.7 | ◎ |
| Example 2 | 8.4 | 15.6 | +10.4 | ○ |
| Example 3 | 8.1 | 15.0 | +9.8 | ○ |
| Example 4 | 8.5 | 15.3 | +13.6 | ○ |
| Example 5 | 8.3 | 15.2 | +13.4 | ○ |
| Example 6 | 8.1 | 15.0 | +13.2 | ○ |
| Example 7 | 8.8 | 15.5 | +13.6 | ◎ |
| Comp. Example 1 | 7.5 | 13.2 | +12.5 | ◎ |
| Comp. Example 2 | 7.2 | 13.5 | +9.5 | ◎ |
| Comp. Example 3 | 7.3 | 12.7 | +10.4 | Δ |
| Comp. Example 4 | 7.8 | 14.1 | +13.9 | Δ |

TABLE 2

| Tire cord | Tensile strength (g/d) | Elongation at specific load (%) | Elongation at break (%) | Thermal shrinkage (%) | Strength ratio (%) |
|---|---|---|---|---|---|
| Ref. Example | 7.8 | 4.5 | 17.2 | +3.6 | 90.7 |
| Example 1 | 7.7 | 4.5 | 16.4 | +5.2 | 89.5 |
| Example 2 | 7.5 | 4.5 | 16.5 | +3.5 | 89.3 |
| Example 3 | 7.2 | 4.5 | 15.8 | +3.2 | 88.9 |
| Example 4 | 7.6 | 4.5 | 16.1 | +5.2 | 89.4 |

TABLE 2-continued

| Tire cord | Tensile strength (g/d) | Elongation at specific load (%) | Elongation at break (%) | Thermal shrinkage (%) | Strength ratio (%) |
|---|---|---|---|---|---|
| Example 5 | 7.5 | 4.5 | 15.9 | +4.9 | 90.4 |
| Example 6 | 7.2 | 4.5 | 15.5 | +4.9 | 88.9 |
| Example 7 | 7.9 | 4.5 | 16.6 | +5.1 | 89.8 |
| Comp. Example 1 | 6.6 | 4.5 | 13.7 | +4.7 | 88.0 |
| Comp. Example 2 | 6.3 | 4.5 | 14.0 | +3.3 | 87.5 |
| Comp. Example 3 | 6.6 | 4.5 | 14.5 | +3.4 | 90.4 |
| Comp. Example 4 | 6.8 | 4.5 | 14.4 | +5.0 | 87.2 |

Referring to Tables 1 and 2, it was confirmed that the tire cords according to Examples were eco-friendly by including recycled PET, and exhibited physical properties equivalent to those of the tire cord of Reference Example.

In Comparative Examples 3 and 4, it was possible to wind up the polyester drawn yarn, but a large amount of fluff and frequent breakage occurred, resulting in relatively poor yarn quality.

The invention claimed is:

1. A tire cord comprising a polyester drawn yarn containing 25 wt % or more of recycled polyethylene terephthalate having an intrinsic viscosity of 0.9 dl/g to 1.5 dl/g and an isophthalic acid content of less than 1.0 mol % based on the total carboxylic acid component,
wherein a tensile strength is 7.0 g/d to 8.0 g/d and an elongation at break is 15.0% to 17.5% when measured according to the standard test method of ASTM D 885.

2. The tire cord of claim 1,
wherein the recycled polyethylene terephthalate has an isophthalic acid content of 0 mol % to 0.95 mol % based on the total dicarboxylic acid component in the recycled polyethylene terephthalate.

3. The tire cord of claim 1, wherein a tensile strength ratio of the tire cord to the polyester drawn yarn, which is {=[(tensile strength of tire cord)/(tensile strength of polyester drawn yarn)]×100}, is 88.5% or more.

4. The tire cord of claim 1,
wherein the tire cord has an elongation at specific load of 3.5% to 5.0% when measured under a load of 4.5 g/d according to the standard test method of ASTM D 885.

5. The tire cord of claim 1,
wherein the tire cord has a thermal shrinkage of 3.0% to 6.0% when measured according to the standard test method of ASTM D 885 (specimen length 250 mm, 177° C., 2 minutes, load of 0.01 g/d).

6. The tire cord of claim 1,
wherein the tire cord comprises a raw-cord having a total fineness of 1000 denier to 9000 denier.

7. The tire cord of claim 1,
wherein the polyester drawn yarn comprises 30 wt % to 100 wt % of the recycled polyethylene terephthalate.

8. The tire cord of claim 1,
wherein the polyester drawn yarn has a tensile strength of 8.0 g/d to 9.0 g/d and an elongation at break of 14.0% to 17.0%.

9. The tire cord of claim 1,
wherein the polyester drawn yarn has a thermal shrinkage of 9.5% to 15.0% when measured according to the standard test method of ASTM D 885 (specimen length 250 mm, 177° C., 2 minutes, load of 0.01 g/d).

10. The tire cord of claim 1,
wherein the polyester drawn yarn has a total draw ratio of 1.0 to 3.0 times.

11. The tire cord of claim 1,
wherein the tire cord is a 2-ply yarn comprising the polyester drawn yarn.

12. A tire comprising the tire cord of claim 1.

* * * * *